(12) United States Patent
Liu et al.

(10) Patent No.: US 7,824,308 B2
(45) Date of Patent: Nov. 2, 2010

(54) METHODS FOR SHIFTING A VEHICLE TRANSMISSION

(75) Inventors: Chia-Hsiang Liu, Northville, MI (US); Ronald Keith Markyvech, Allen Park, MI (US)

(73) Assignee: Eaton Corporation, Cleveland, OH (US)

(*) Notice: Subject to any disclaimer, the term of this patent is extended or adjusted under 35 U.S.C. 154(b) by 664 days.

(21) Appl. No.: 11/850,864

(22) Filed: Sep. 6, 2007

(65) Prior Publication Data
US 2009/0069153 A1 Mar. 12, 2009

(51) Int. Cl.
*B60W 10/06* (2006.01)
*B60W 10/10* (2006.01)

(52) U.S. Cl. ......................... 477/41; 477/109
(58) Field of Classification Search ................. 477/109, 477/41
See application file for complete search history.

(56) References Cited

U.S. PATENT DOCUMENTS

| | | | |
|---|---|---|---|
| 4,355,550 A * | 10/1982 | Will et al. ................ | 477/102 |
| 4,436,072 A * | 3/1984 | Suzuki et al. ............ | 123/406.45 |
| 4,458,561 A | 7/1984 | Frank | |
| 4,682,511 A | 7/1987 | Wittke | |
| 4,691,285 A | 9/1987 | Takeda | |
| 4,699,025 A | 10/1987 | Omitsu | |
| 4,936,165 A | 6/1990 | Doyle et al. | |
| 5,055,094 A | 10/1991 | Cataldo | |
| 5,580,331 A * | 12/1996 | Shiraishi et al. .......... | 477/109 |
| 5,643,121 A | 7/1997 | Greenwood et al. | |
| 5,669,846 A | 9/1997 | Moroto et al. | |
| 5,699,846 A | 12/1997 | Ohanesian | |
| 5,911,771 A | 6/1999 | Reichart et al. | |
| 5,980,414 A | 11/1999 | Larkin | |
| 6,056,661 A | 5/2000 | Schmidt | |
| 6,098,002 A | 8/2000 | Horiguchi et al. | |
| 6,098,022 A | 8/2000 | Sonnichsen et al. | |
| 6,285,941 B1 | 9/2001 | Janecke | |
| 6,447,422 B1 | 9/2002 | Haka | |
| 6,721,643 B1 | 4/2004 | Hanggi et al. | |
| 6,859,709 B2 | 2/2005 | Joe et al. | |
| 6,909,953 B2 | 6/2005 | Joe et al. | |
| 6,986,725 B2 | 1/2006 | Morscheck | |
| 7,371,204 B2 * | 5/2008 | Reuschel et al. .............. | 477/45 |
| 7,513,847 B2 * | 4/2009 | Tabata et al. ................... | 477/15 |
| 7,670,261 B2 * | 3/2010 | Halleberg et al. ........... | 477/109 |
| 2001/0049574 A1 | 12/2001 | Taniguchi et al. | |
| 2002/0161503 A1 | 10/2002 | Joe et al. | |
| 2004/0049328 A1 | 3/2004 | Lee | |
| 2004/0087407 A1 | 5/2004 | Kmicikiewicz | |
| 2004/0127321 A1 | 7/2004 | Morscheck | |
| 2005/0054469 A1 | 3/2005 | Dyck et al. | |
| 2005/0215393 A1 | 9/2005 | Shimoda | |
| 2005/0278102 A1 | 12/2005 | Kim et al. | |

* cited by examiner

*Primary Examiner*—Sherry Estremsky
(74) *Attorney, Agent, or Firm*—Brooks Kushman P.C.

(57) ABSTRACT

A continuously variable transmission mechanically coupled with an automated mechanical transmission is adjusted during a shifting process. At the completion of the shifting process, an engine mechanically coupled with the automated mechanical transmission is provided a fueling pulse. Additionally, the speed of an output shaft of the automated mechanical transmission is filtered by a second order variable time constant low pass filter.

20 Claims, 7 Drawing Sheets

METHODS FOR SHIFTING A VEHICLE TRANSMISSION

BACKGROUND

1. Field of the Invention

The invention relates to methods for shifting a vehicle transmission.

2. Background Art

A powertrain system for a vehicle generally includes an engine and a multi-ratio transmission. An output shaft of the engine is mechanically coupled to an input shaft of the transmission. Before shifting from a first gear to a second gear, the input shaft may need to achieve a target speed. The target speed is based on the gear ratio associated with the second gear and the speed of an output shaft of the transmission. Fuel supplied to the engine is temporarily reduced or eliminated to reduce the input shaft speed to the target speed. The shifting process is completed when the input shaft speed approaches the target speed. The time for the input shaft speed to reach the target speed depends on the dynamics associated with the operation of the engine.

In one example, the process of shifting the transmission involves disengaging a dog clutch from a first gear and subsequently engaging the dog clutch with a second gear. Engaging the second gear may be accompanied by a lurching movement caused by slack in gearing of the transmission. Shifting with a dog clutch may cause large fluctuations in the speed of the output shaft of the transmission.

SUMMARY

An engine power transformer may include a continuously variable transmission. The engine power transformer may be mechanically coupled with an input shaft of an automated mechanical transmission and an engine. The continuously variable transmission may be adjusted during a shifting process to synchronize the speeds of the input shaft and an output shaft of the automated mechanical transmission. At the completion of the shifting process, the engine may be provided a fueling pulse to eliminate slack in gearing of the automated mechanical transmission. A target ratio for sheaves of the continuously variable transmission may be based on a filtered speed of the output shaft of the automated mechanical transmission and a target speed of the engine. A second order variable time constant low pass filter may be used to filter the output shaft speed.

DETAILED DESCRIPTION

Figure 1:
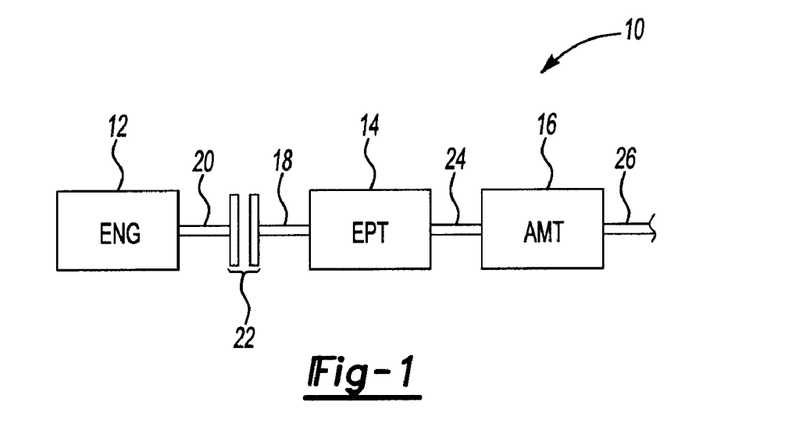
FIG. 1 is a schematic diagram of an example vehicle powertrain system.

FIG. 1 is a schematic diagram of a vehicle powertrain system 10. In the embodiment of FIG. 1, system 10 includes an engine 12, an engine power transformer (EPT) 14, and an automated mechanical transmission (AMT) 16. An input shaft 18 of the EPT 14 may be mechanically coupled with an output shaft 20 of the engine 12 via a clutch 22. A coupling shaft 24 mechanically couples the EPT 14 and AMT 16. An output shaft 26 of the AMT 16 may be mechanically coupled with a drive axle of a vehicle (not shown).

Figure 2:
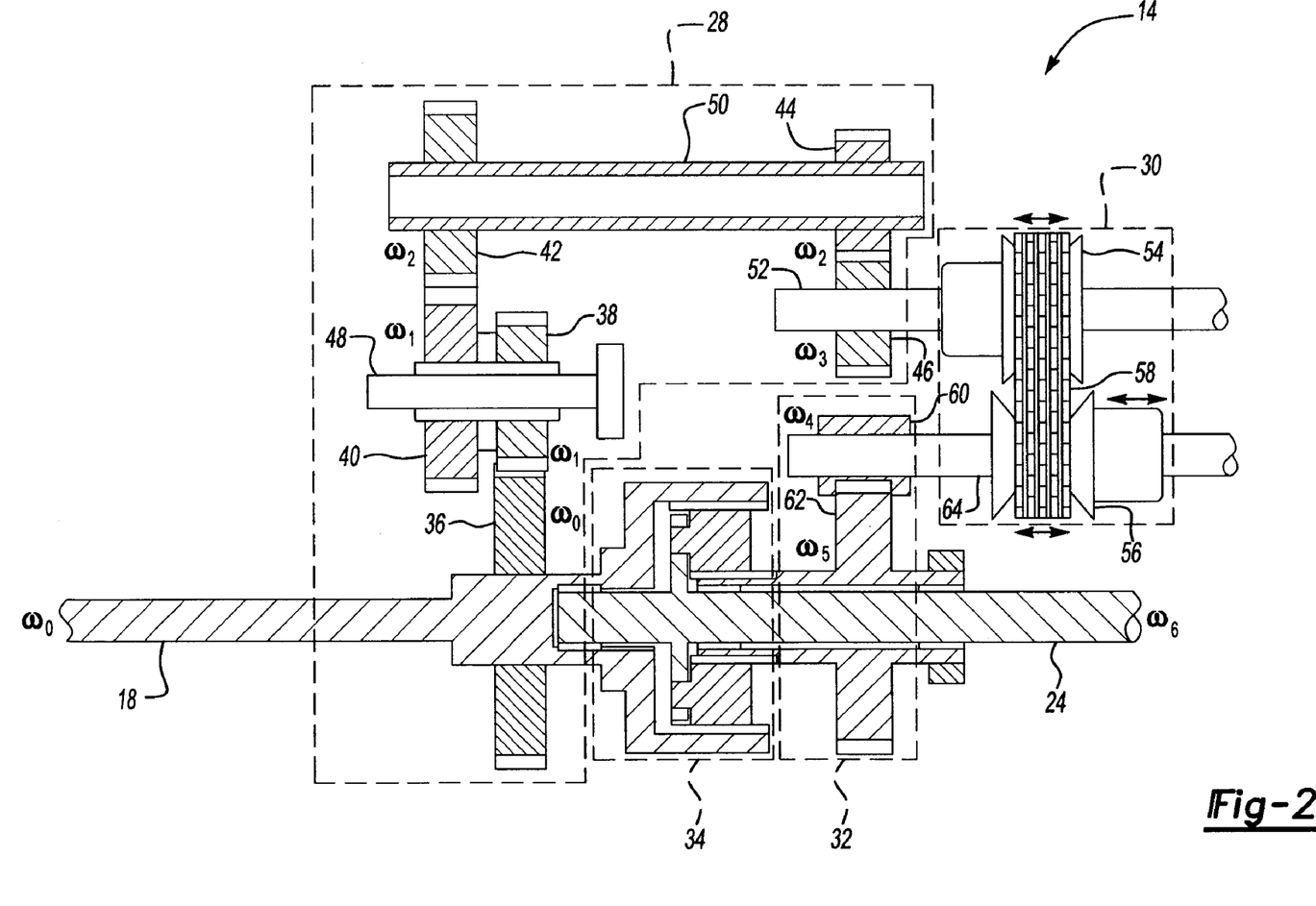
FIG. 2 is a schematic diagram of the engine power transformer of FIG. 1.

FIG. 2 is a schematic diagram of an embodiment of the EPT 14. EPT 14 includes a step up gear set 28, a continuously variable transmission (CVT) 30, a step-down gear set 32, and a planetary gear set 34. The step up gear set 28 in the illustrated embodiment includes gears 36, 38, 40, 42, 44, 46. Gear 36 rotates with input shaft 18 and has a speed of $\omega_0$. Gears 38, 40 rotate with a shaft 48 and have a speed of $\omega_1$. Gears 42, 44 rotate with a shaft 50 and have a speed of $\omega_2$. Gear 46 is mechanically coupled with the CVT 30 by the shaft 52 and has a speed of $\omega_3$.

CVT 30 includes a first variator sheave 54 and a second variator sheave 56 that are mechanically coupled via belt 58. Variator sheaves 54, 56 have speeds of $\omega_3$, $\omega_4$ respectively. Variator sheaves 54, 56 may be adjusted axially to alter their effective diameters thereby altering the CVT ratio $\omega_3/\omega_4$.

The Step-down gear set 32 includes a pair of gears 60, 62. Gear 60 is mechanically coupled with CVT 30 via shaft 64. Gear 62 is mechanically coupled to the coupling shaft 24. Gears 60, 62 rotate at speeds $\omega_4$, $\omega_5$ respectively. The coupling shaft 24 is mechanically coupled with the step down gear set 32 by the planetary gear set 34. Coupling shaft 24 rotates at a speed of $\omega_6$.

The EPT 14 transfers torque from the input shaft 18 to the coupling shaft 24 and has an EPT ratio of $\omega_0/\omega_6$.

Figure 3:
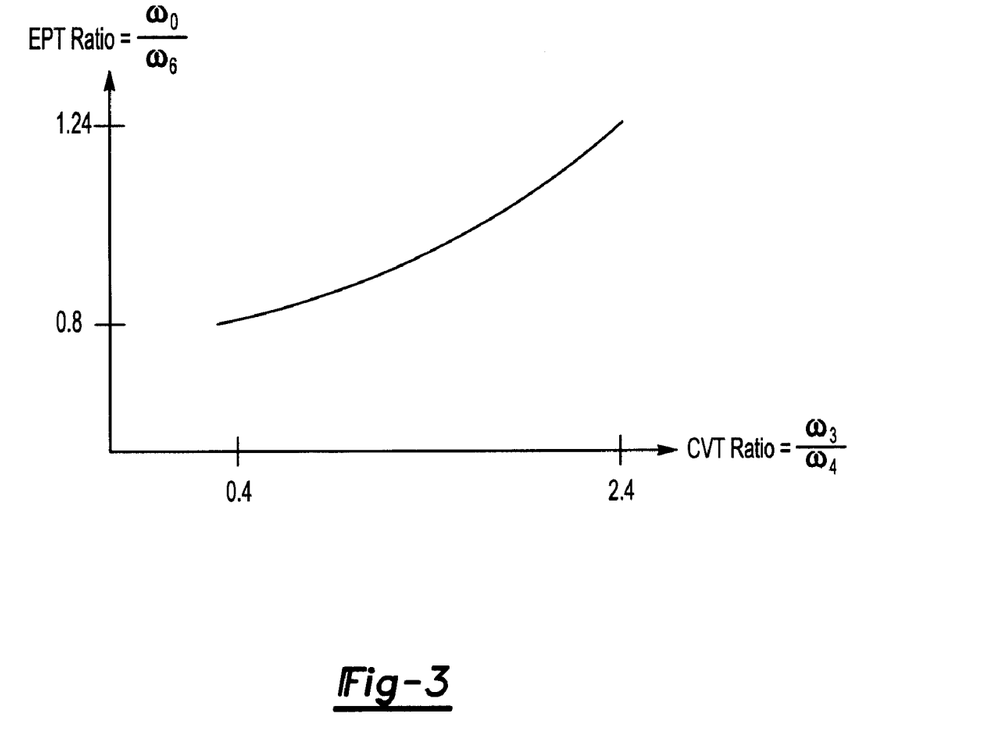
FIG. 3 is one example of a plot of the engine power transformer ratio versus the continuously variable transmission ratio of the engine power transformer of FIG. 2.

FIG. 3 is a plot of the EPT ratio versus the CVT ratio for EPT 14. The variator sheaves 54, 56 are adjusted as described with reference to FIG. 2 above to change the EPT ratio of EPT 14. In the embodiment of FIG. 3, as the CVT ratio increases, the EPT ratio increases. In other embodiments, as the CVT ratio increases, the EPT ratio may decrease.

Figure 4A:
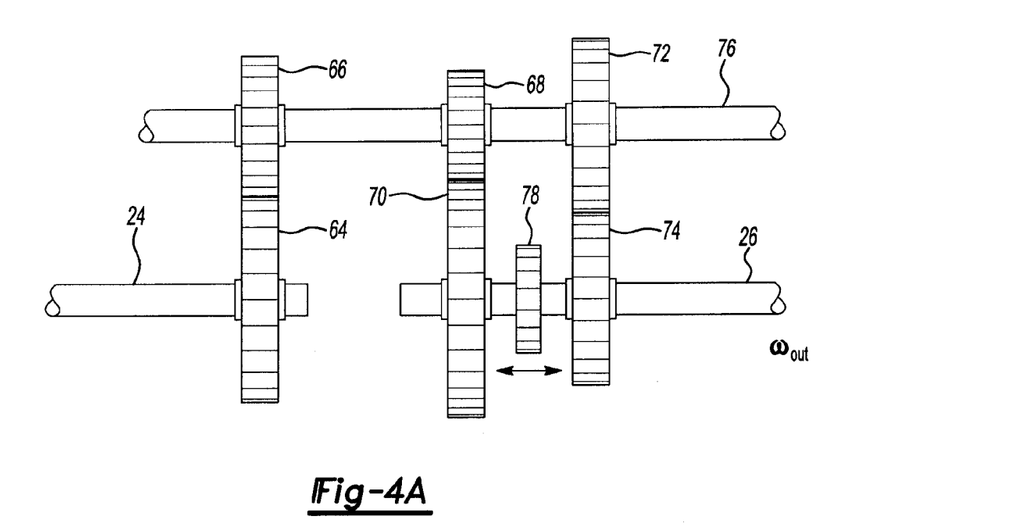
FIG. 4A is a schematic diagram, side view, of an embodiment of the automated mechanical transmission of FIG. 1.

FIG. 4A is a schematic diagram, side view, of an embodiment of the AMT 16. AMT 16 includes a plurality of gears 64, 66, 68, 70, 72, 74. Gears 66, 68, 72 rotate with a shaft 76. A dog clutch 78 may engage either gear 70 or gear 74 to change the effective gear ratio of AMT 16 between coupling shaft 24 and the output shaft 26. When the dog clutch 78 engages gear 70, gear 74 free spins and torque from the coupling shaft 24 is transferred to the output shaft 26 via gears 64, 66, 68, 70. When the dog clutch 78 engages gear 74, gear 70 free spins and torque from the coupling shaft 24 is transferred to the output shaft 26 via the gears 64, 66, 72, 74. In alternative embodiments, the AMT 16 may include any desired number of gears configured to transfer torque from the coupling shaft 24 to the output shaft 26.

Figure 4B:
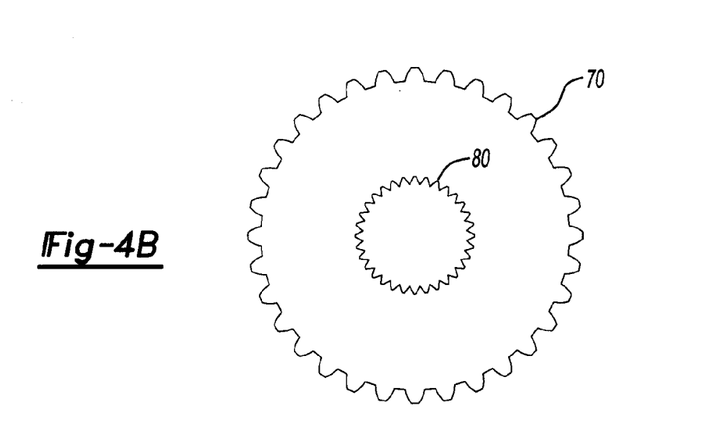
FIG. 4B is a schematic diagram, front view, of a gear of the automated mechanical transmission of FIG. 4A.

FIG. 4B is a schematic diagram, front view, of the gear 70. Gear 70 includes an opening 80 for receiving the dog clutch 78 (FIG. 4A). Similarly, gear 74 (FIG. 4A) has an opening (not shown) similar to that of gear 70 for receiving the dog clutch 78.

Figure 5:
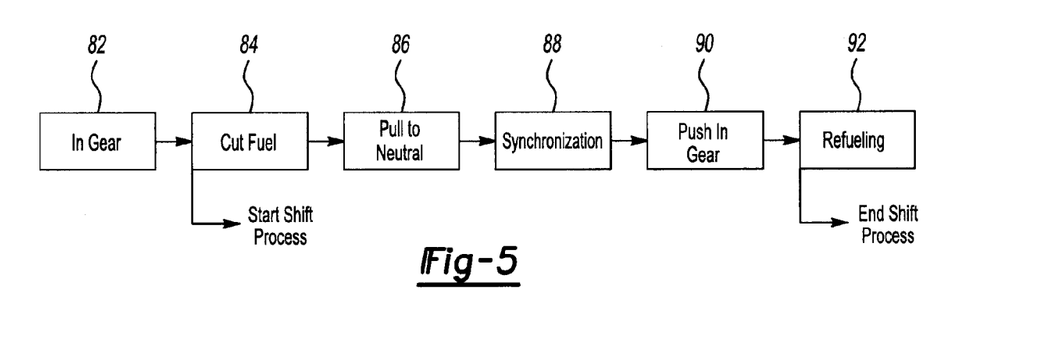
FIG. 5 is a flow chart of an embodiment of a shifting process for the powertrain system of FIG. 1.

FIG. 5 is a flow chart of an embodiment of a shifting process for system 10 (FIG. 1). At 82, the AMT 16 is in gear, e.g., the dog clutch 78 is engaged with gear 70. At 84, the fuel command to engine 12 is cut. At 86, the AMT 16 is pulled to neutral, e.g., the dog clutch 78 is disengaged with gear 70. At 88, the input shaft 18 and output shaft 26 are synchronized. At 90, the AMT 16 is pushed in gear, e.g., the dog clutch 78 is engaged with gear 74. At 92, the engine 12 is refueled.

Figures 6, 8:
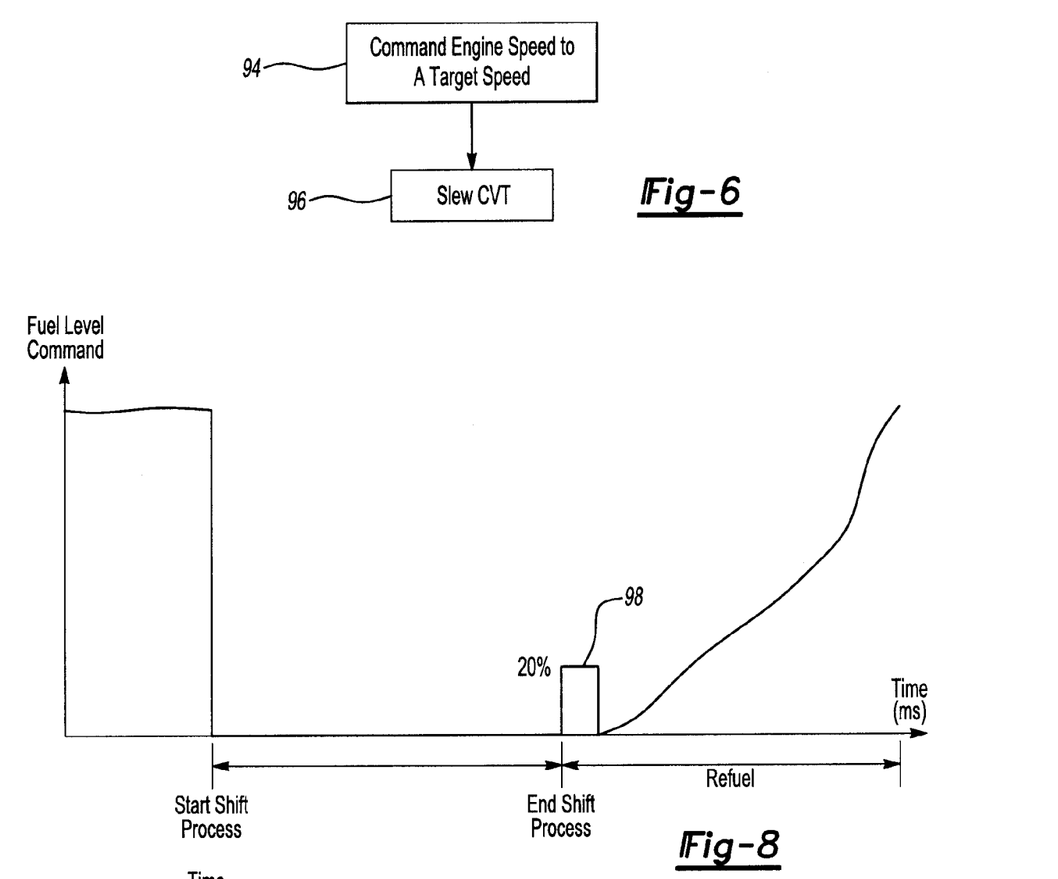
FIG. 6 is a flow chart of an embodiment of the synchronization portion of the shifting process of FIG. 5.
FIG. 8 is one example of a plot of the commanded fuel level versus time associated with the shifting process of FIG. 5.

FIG. 6 is a flow chart of an embodiment of the synchronization portion of the shifting process of FIG. 5. At 94, the engine speed is commanded to a target speed. At 96, the CVT 30 (FIG. 2) is slewed, that is, the effective diameters of sheaves 54, 56 are adjusted in a continuous fashion.

Referring to FIGS. 1, 2 and 4A, the speed of the input shaft 18 is related to the speed of the output shaft 26 by the following $$\omega_{out} * \text{EPT Ratio} * \text{AMT Ratio} = \omega_0$$

where $\omega_{out}$ = speed of the output shaft 26

$\omega_0$ = speed of the input shaft 18

AMT Ratio = effective gear ratio of the AMT 16

The AMT 16, in the embodiment of FIG. 4A, has two effective gear ratios:

AMT Ratio$_1$ = effective gear ratio of the gears 64, 66, 68, 70
AMT Ratio$_2$ = effective gear ratio of the gears 64, 66, 72, 74

If the dog clutch 78 is engaged with gear 70, the AMT 16 has an effective gear ratio of AMT Ratio$_1$. If the dog clutch 78 is engaged with gear 74, the AMT 16 has an effective gear ratio of AMT Ratio$_2$. Prior to shifting from gear 70 to gear 74, the speed of the input shaft 18 is related to the speed of the output shaft 26 by the following $$\omega_0 = \omega_{out} * \omega_0/\omega_6 * \text{AMT Ratio}_1$$

As explained with reference to FIG. 5, the speeds of the input shaft 18 and output shaft 24 are synchronized when shifting from one gear to another gear. For example, the target speed for the input shaft 18, when shifting to gear 74, is given by the following $$\omega_0 \text{Target} = \omega_{out} * \omega_0/\omega_6 * \text{AMT Ratio}_2$$

As explained with reference to FIG. 6, in addition to cutting the fueling level command to the engine 12, the CVT ratio may also be altered by adjusting the variator sheaves 54, 56.

Figure 7A:
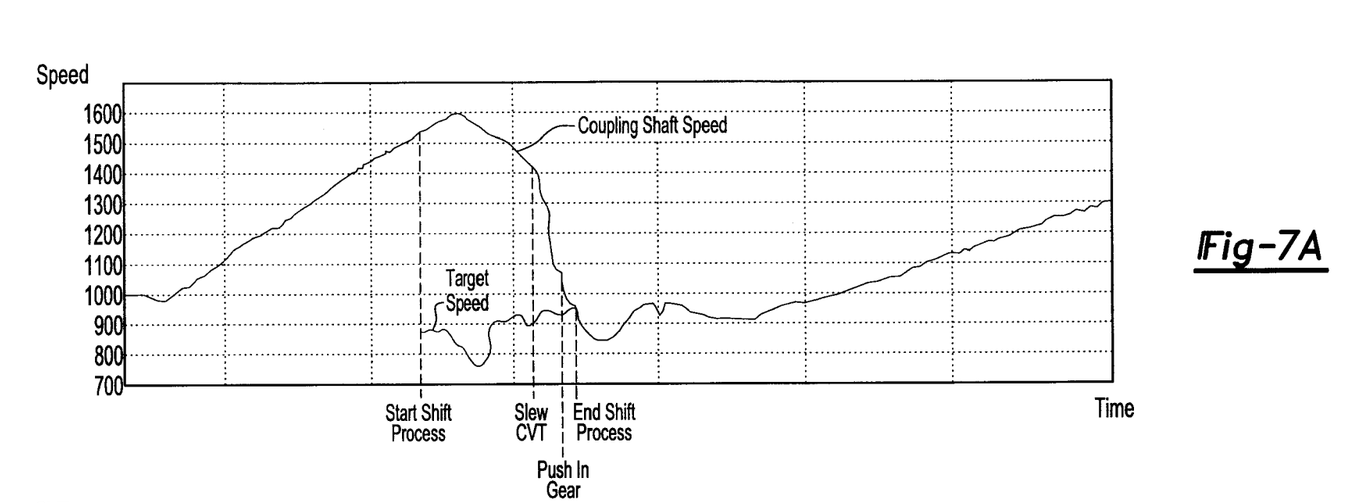
FIG. 7A is one example of a plot of the coupling shaft speed and target speed versus time for the automated mechanical transmission of FIG. 4A.

FIG. 7A is an example plot of the coupling shaft speed and target speed versus time for the automated mechanical transmission of FIG. 4A. Shortly after the start of the shifting process, the coupling shaft speed begins to decrease as the fueling level command to the engine 12 has been cut. This rate of initial decrease depends on the dynamics of the engine 12. When the coupling shaft speed is approximately 50% of the target speed, the diameter of variator sheave 54 is decreased and the diameter of variator sheave 56 is increased. The AMT 16 is put in gear once the coupling shaft speed is approximately equal to the target speed.

Figure 7B:
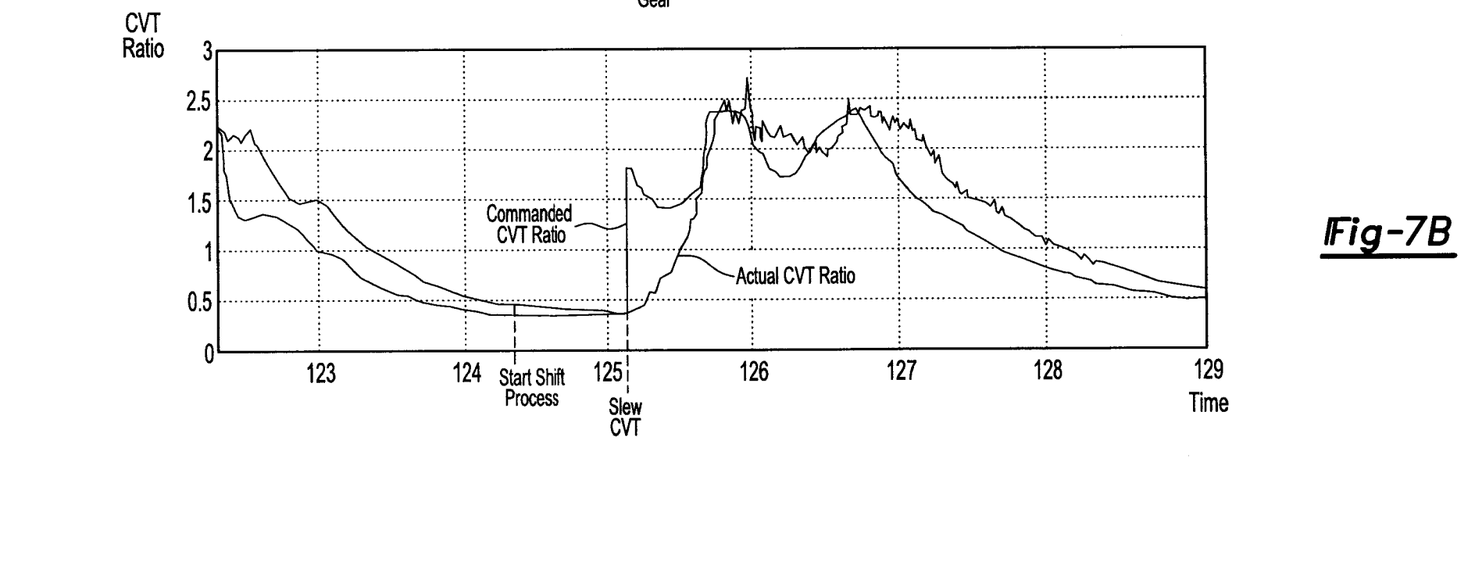
FIG. 7B is one example of a plot of the commanded continuously variable transmission ratio and the actual continuously variable transmission ratio versus time for the engine power transformer of FIG. 2.

FIG. 7B is a plot of the commanded CVT ratio and actual CVT ratio versus time and shows the increase in CVT ratio during the slewing of CVT 30.

FIG. 8 is an example plot of the commanded fuel level versus time associated with the shifting process of FIG. 5. Slack in the gearing of the EPT 14 may become apparent during the shifting process described above. A pulsed fuel command 98 is given at the beginning of the refueling of the engine 12 (FIG. 1) to eliminate the effect of this slack by gently taking up the slack in a very controlled manner. In the embodiment of FIG. 8, the pulsed fuel command 98 is at 20% of the maximum engine torque command and has a duration of 80 milliseconds. In other embodiments, the level and duration of the command may be dictated by the system dynamics.

Figure 9:
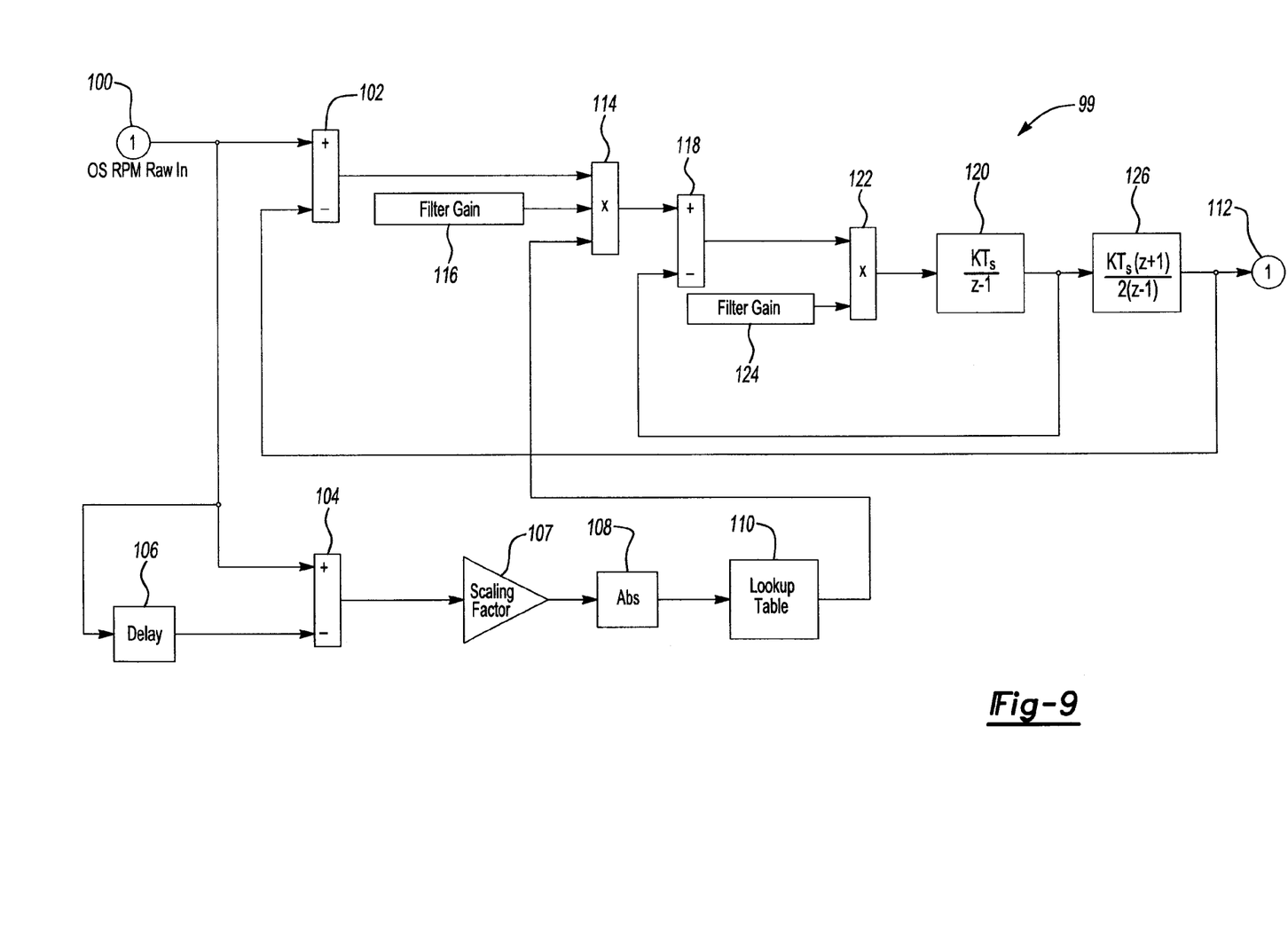
FIG. 9 is a block diagram of an embodiment of a second order variable time constant low pass filter.

FIG. 9 is a block diagram of an embodiment of a second order variable time constant low pass filter 99. A measured speed 100 of the output shaft 26 is fed into a pair of comparators 102, 104. A delay 106 delays the measured speed 100 for a predetermined duration, e.g., 1 sec. The output of the delay 106 is also fed into the comparator 104. Comparator 104 takes the difference between the measured speed 100 and the output of delay 106. This difference is then scaled by a scaling factor 107 and the absolute value taken at 108 resulting in an error value. A look-up table 110 outputs a time constant adjustment for a given error value.

Figure 10:
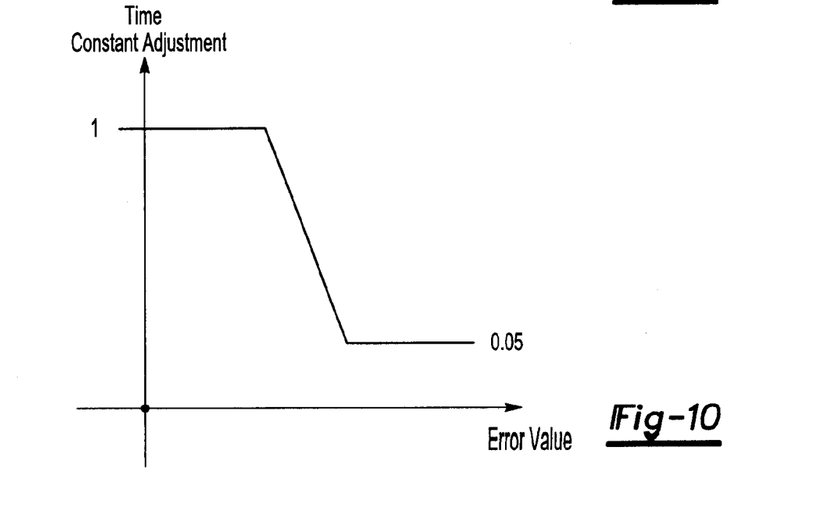
FIG. 10 is one example of a plot of the time constant adjustment versus error of the second order variable time constant low pass filter of FIG. 9.

FIG. 10 is a plot of the time constant adjustment versus error value in the look-up table 110. In the embodiment of FIG. 10, the time constant adjustment is 1 for low values of error and 0.5 for high values of error. In alternative embodiments, the time constant adjustment versus error data may be different.

Referring to FIG. 9, a filtered speed 112 of the output shaft 26 is fed into the comparator 102. Comparator 102 takes the difference between the measured speed 100 and filtered speed 112. This difference is fed into a product block 114 along with a filter gain 116 and the time constant adjustment from the look-up table 110. This product is fed into a comparator 118 along with the output from a first order filter block 120. Comparator 118 takes the difference between the product and the output from the first order filter block 120. This difference is fed into a product block 122 along with a filter gain 124. The resulting product is fed into the first order filter block 120. The output of the first order filter block 120 is fed into a first order filter block 126.

In the example of FIG. 9, K is the gain, $T_s$ is the time constant, and z is the discrete transfer function variable of the first order filter blocks 120, 126.

In alternative embodiments, any n-order variable time constant low pass filter capable of accomplishing the methods described herein may be used. For example, a third order low pass filter may be used that adjusts its time constant according to the input signal amplitude fluctuation.

Figure 11A:
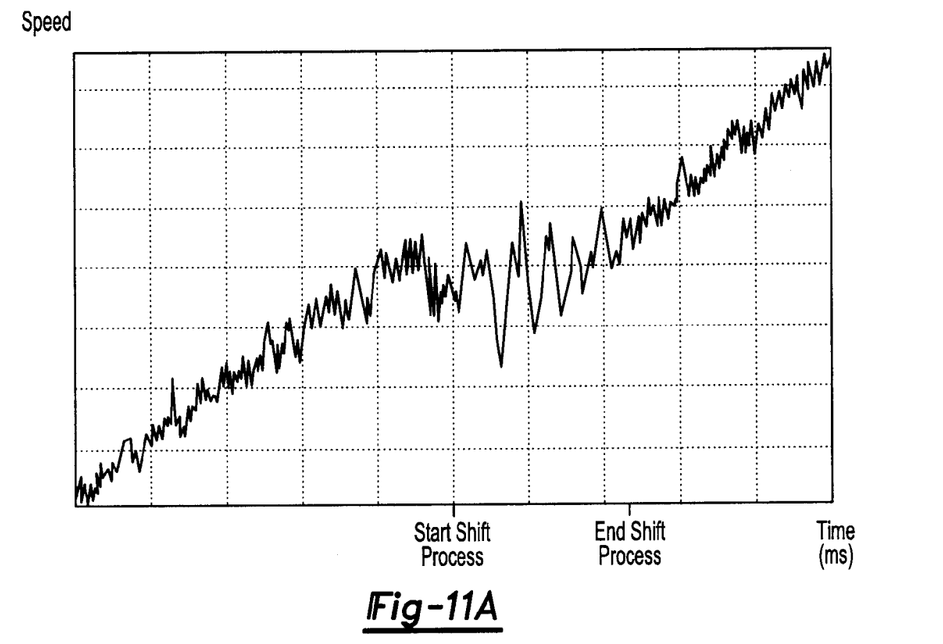
FIG. 11A is one example of a plot of the unfiltered output shaft speed versus time of the automated mechanical transmission of FIG. 4A.

FIG. 11A is an example plot of the measured unfiltered output shaft speed versus time of the AMT 16 (FIG. 1). The output shaft speed may be measured, for example, with a speed sensor. During a shifting process as described above, the speed of the output shaft 26 (FIG. 1) experiences non-smooth behavior, or large fluctuations, due to the dynamics associated with shifting gears. As described below, such behavior may result in a CVT ratio that also exhibits large fluctuations.

The filter 99 (FIG. 9) selectively filters the measured output shaft speed. Prior to the shifting process, the measured speed 100 (FIG. 9) of the output shaft 26 (FIG. 1) is relatively smooth. Thus, the output of the delay 106 (FIG. 9) is approximately equal to the measured speed 100 resulting in a relatively small error value. The time constant adjustment, from FIG. 10, is approximately 1. A time constant adjustment of approximately 1 does not alter the time constant of the filter 99. During the shifting process, the measured speed 100 of the output shaft 26 is not relatively smooth. The output of the delay 106 is different from the measured speed 100 resulting in a relatively large error value. The time constant adjustment, from FIG. 10, takes on values less than 1. A time constant adjustment of less than 1 alters the time constant of filter 99, resulting in lower cut-off frequencies and increased phase lag. After the shifting process, the measured speed 100 of the output shaft 26 is again relatively smooth. The output of the delay 106 is approximately equal to the measured speed 100 resulting in a relatively small error value. The time constant adjustment, from FIG. 10, is again approximately 1 which returns the time constant of the filter 99 to its preshifting value.

Figure 11B:
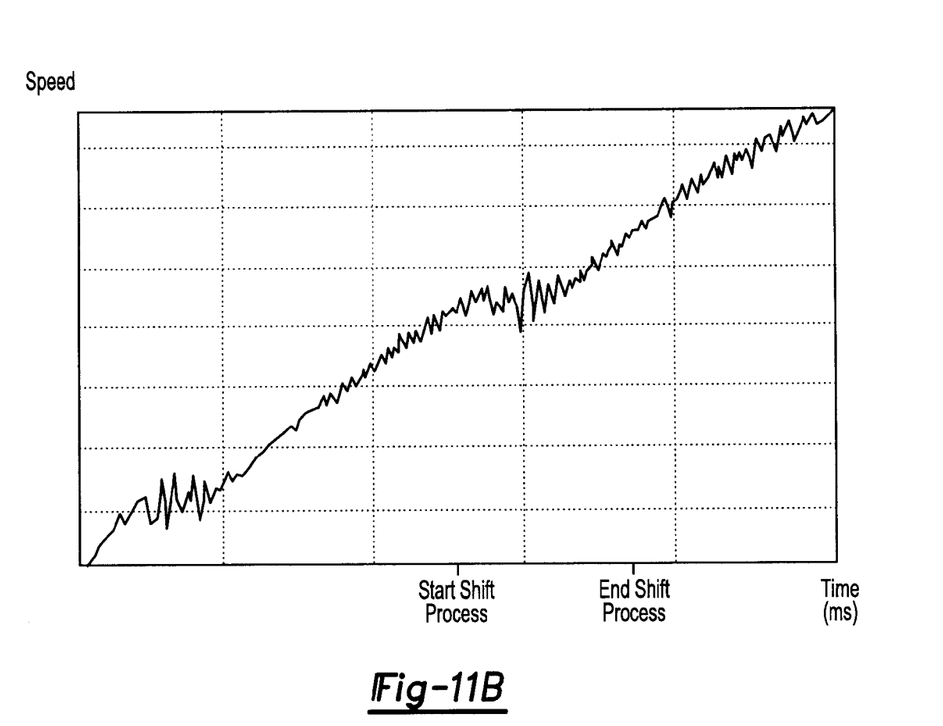
FIG. 11B is one example of a plot of the filtered output shaft speed versus time of the automated mechanical transmission of FIG. 4A.

FIG. 11B is an example plot of the filtered output shaft speed versus time of the AMT 16 (FIG. 1). The filtered output shaft speed of FIG. 11B is smoother than the unfiltered output shaft speed of FIG. 11A.

The filtered output shaft speed is used to determine the CVT ratio. Multiplying the filtered output shaft speed by the appropriate effective gear ratio of AMT 16, i.e., AMT Ratio$_1$ or AMT Ratio$_2$, yields the filtered coupling shaft speed, $\omega_6$.

During an up-shift process as described herein, the target input shaft speed, $\omega_0$, is determined by the target speed for the engine output shaft 20 after the shifting process is complete. The quotient of the target input shaft speed and the coupling shaft speed yields the target EPT ratio. Referring to FIG. 3, a target CVT ratio is determined based on the target EPT ratio. Sheaves 54, 56 of the EPT 30 may be adjusted to achieve the target CVT ratio.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for shifting an automated multiple-ratio mechanical transmission of a powertrain system wherein the automated multiple-ratio mechanical transmission includes an input shaft and an output shaft and has a first gear, a second gear, and a neutral gear, and wherein the powertrain system includes a continuously variable transmission mechanically coupled with the automated multiple-ratio mechanical transmission via the input shaft and an engine mechanically coupled with the input shaft, the method comprising:
    shifting the transmission from the first gear into the neutral gear;
    synchronizing the input shaft with the output shaft including slewing the continuously variable transmission;
    shifting the transmission from the neutral gear into the second gear; and
    providing a predetermined pulse of fuel to the engine to reduce slack in gearing of the transmission.

2. The method of claim 1 wherein the continuously variable transmission has a continuously variable transmission ratio and wherein slewing the continuously variable transmission includes altering the continuously variable transmission ratio.

3. The method of claim 1 wherein the continuously variable transmission includes a variator sheave and wherein slewing the continuously variable transmission includes adjusting the variator sheave.

4. The method of claim 1 wherein the engine has an operating speed and wherein the step of synchronizing the input shaft with the output shaft further includes commanding the engine speed to a target speed.

5. The method of claim 4 further comprising changing the rate at which fuel is supplied to the engine.

6. The method of claim 1 further comprising refueling the engine after the step of providing the predetermined pulse of fuel to the engine.

7. The method of claim 1 wherein the pulse has a duration less than 100 milliseconds.

8. The method of claim 1 wherein the engine has an engine torque command and wherein the pulse has an amplitude of about 20% of the engine torque command.

9. A method for shifting an automated mechanical transmission of a powertrain system wherein the automated mechanical transmission includes an input shaft and an output shaft and has a first gear, a second gear, and a neutral gear, and wherein the powertrain system includes an engine mechanically coupled with the input shaft, the method comprising:
    reducing a supply of fuel to the engine;
    shifting the transmission from the first gear into the neutral gear;
    synchronizing the input shaft with the output shaft;
    shifting the transmission from the neutral gear into the second gear; and
    providing a predetermined pulse of fuel to the engine to reduce slack in gearing of the transmission.

10. The method of claim 9 further comprising refueling the engine after the step of providing the predetermined pulse of fuel to the engine.

11. The method of claim 9 wherein the pulse has a duration less than 100 milliseconds.

12. The method of claim 9 wherein the engine has an engine torque command and wherein the pulse has an amplitude of about 20% of the engine torque command.

13. The method of claim 9 wherein the powertrain system further includes a continuously variable transmission mechanically coupled with the automated mechanical transmission via the input shaft and wherein the step of synchronizing the input shaft with the output shaft includes slewing the continuously variable transmission.

14. The method of claim 13 wherein the continuously variable transmission has a continuously variable transmission ratio and wherein slewing the continuously variable transmission includes altering the continuously variable transmission ratio.

15. The method of claim 13 wherein the continuously variable transmission includes a variator sheave and wherein slewing the continuously variable transmission includes adjusting the variator sheave.

16. The method of claim 9 further comprising changing the rate at which fuel is supplied to the engine.

17. A method for controlling sheaves of a continuously variable transmission mechanically coupled with an output shaft of an automated mechanical transmission and an engine having a target speed, the method comprising:

measuring the speed of the output shaft;

filtering the measured output shaft speed with a filter having a time constant that depends on an amplitude fluctuation of the speed of the output shaft;

selecting a target ratio for the sheaves based on the filtered output shaft speed and the target engine speed; and adjusting the sheaves such that the target ratio is achieved thereby controlling the sheaves of the continuously variable transmission.

18. The method of claim 17 wherein the amplitude fluctuation of the speed of the output shaft is determined by comparing a current output shaft speed to a previous output shaft speed.

19. The method of claim 17 wherein the time constant increases as the amplitude fluctuation increases.

20. The method of claim 17 wherein the time constant decreases as the amplitude fluctuation decreases.

* * * * *